United States Patent Office 2,716,143
Patented Aug. 23, 1955

2,716,143

PREPARATION OF VINYL FLUORIDE AND 1,1-DIFLUOROETHANE AND CATALYST THEREFOR

Benjamin F. Skiles, Wilmington, Del., assignor to E. I. du Pont de Nemours and Company, Wilmington, Del., a corporation of Delaware No Drawing. Application July 25, 1952,
Serial No. 300,984

7 Claims. (Cl. 260—653)

This invention relates to a method for preparing vinyl fluoride and 1,1-difluoroethane, and to a novel and improved catalyst which is particularly adapted for use in the preparation of such compounds.

Vinyl fluoride is a valuable compound, particularly for the preparation of polymeric plastic materials and the like. 1,1-Difluoroethane is valuable as a refrigerant, as a propellant for producing aerosols, and for other purposes. It has been proposed to manufacture vinyl fluoride and 1,1-difluoroethane by reacting acetylene with hydrogen fluoride in the presence of mercury compounds as catalysts. Such mercury catalysts are expensive and relatively difficult to prepare, tend to be unstable, have short catalyst lives, give poor yields of products, and frequently exhibit long induction periods before the reaction begins. Also, in order to obtain vinyl fluoride as the predominant product, it is generally necessary to employ an excess of acetylene.

Hillyer et al., in Patent No. 2,471,525, disclose that aluminum trifluoride and aluminum oxide are effective catalysts for such reaction and produce vinyl fluoride and 1,1-difluoroethane in substantially equal proportions. In Patent No. 2,574,480, Hillyer et al. disclose that a mixture of alumina and zinc fluoride is also an effective catalyst to produce vinyl fluoride and 1,1-difluoroethane in substantially equal molar ratios, but demonstrate by experiment that zinc fluoride alone, deposited on a graphite support, is not a catalyst for such reaction. It is desirable to provide a catalyst for the reaction which will make it possible to vary the relative yields of vinyl fluoride and 1,1-difluoroethane, so that either can be obtained as the predominant product.

It is an object of my invention to provide a novel and improved catalyst for producing vinyl fluoride and 1,1-difluoroethane. A particular object is to provide such a catalyst for the reaction of acetylene with hydrogen fluoride, whereby either vinyl fluoride or 1,1-difluoroethane can be obtained as the predominant product. Another object is to provide a process for preparing such a catalyst. A further object is to provide a method for reacting acetylene with hydrogen fluoride in the presence of such a catalyst whereby the relative yields of vinyl fluoride and 1,1-difluoroethane can be varied. Other objects are to provide new compositions of matter and to avance the art. Still other objects will appear hereinafter.

The above and other objects may be accomplished in accordance with my invention which comprises preparing a novel catalyst from aluminum sulfate, and employing such catalyst in the production of vinyl fluoride and 1,1-difluoroethane. The catalyst of my invention is prepared by heating a bed of particles of aluminum sulfate to a temperature of from about 100° C. to about 200° C., flowing a gaseous mixture of HF and nitrogen through such bed of particles maintained at such temperatures until there is a material decrease in the rate at which the HF is removed from the gaseous mixture by said bed, and then discontinuing the flow of the gaseous mixture through the bed.

Such catalyst is employed in the production of vinyl fluoride and 1,1-difluoroethane by heating such catalyst bed to a temperature of from about 250° C. to about 400° C.; flowing a gaseous mixture of HF and acetylene, in a proportion of from about 2 to about 5 mols of HF to each mol of acetylene, through such bed at a rate of from about 20 to about 205 volumes of acetylene per volume of particles per hour while maintaining the bed at a temperature of from about 250° C. to about 400° C.; and separating vinyl fluoride and 1,1-difluoroethane from the gaseous mixture leaving the bed.

I have found that, by treating particles of aluminum sulfate with a gaseous mixture of HF and nitrogen under the conditions above set forth, a product is obtained which is particularly valuable as a catalyst for the reaction of acetylene with HF and has the unusual and unpredictable property of permitting variation in the relative yields of vinyl fluoride and of 1,1-difluoroethane, whereby either can be obtained as the predominant product. Such catalyst is also effective for dehydrofluorinating 1,1-difluoroethane to produce high yields of vinyl fluoride. Such catalyst is easy and relatively cheap to make and has an unusually long catalyst life.

The particles of the aluminum sulfate, which are to be employed for producing the catalyst, may be in various forms. They may be in granular form produced by well known methods, as by carefully evaporating a solution of aluminum sulfate, heating the solid to give a porous friable anhydrous mass, crushing such mass and then screening the crushed material to obtain particles of the desired size, preferably 6 to 12 mesh. The particles may be in the form of pellets made by intimately mixing the aluminum sulfate with a binder, such as graphite, pressing into the form of pellets, and subsequently heating the pellets slowly in air. Also, such particles may be made by depositing the aluminum sulfate in well known manner on particles of a carbon support, such as charcoal and graphite. In accordance with well known principles, the particles should be sufficiently small to provide large surface areas for contact with the reactant gases, but ordinarily should not be so small as to unduly obstruct the passage of the gases therethrough or to be readily carried out of the reaction zone by the effluent gases. I have found particles of from about 3 mesh to about 12 mesh size to be quite satisfactory, and 6 to 12 mesh are preferred. The catalyst bed may be of the fluid bed type, if desired.

In order to produce a catalyst of the desired character, it is essential to treat the particles of aluminum sulfate with hydrogen fluoride at temperatures above 50° C. and usually in the range of from about 100° C. to about 200° C. Under such conditions, the HF rapidly combines with the aluminum sulfate until each 400 cc. of the particles contain from about 50 to about 100 grams of HF. The nature of the reactions taking place and of the products obtained have not been fully determined because of the difficulty of obtaining an accurate analysis, and are not completely understood. Analysis of the used catalyst indicates that it contains some inorganic fluorine and that the sulfur content is lowered, but it does not correspond to a mixture of $AlF_3$ and $Al_2(SO_4)_3$. Also, it would not be expected that HF would convert $$Al_2(SO_4)_3$$

to $AlF_3$ under these conditions. Furthermore, while $AlF_3$ produces substantially equal proportions of vinyl fluoride and 1,1-difluoroethane, my catalyst can be caused to produce products containing up to 94% of 1,1-difluoroethane or up to 76% of vinyl fluoride, by proper control of the reaction conditions. Accordingly, the fluorine is probably present mainly as part of a complex salt together with some adsorbed HF. If, unexpectedly, any of the fluorine is present as aluminum fluoride, its action appears to be modified by the aluminum sulfate.

Desirably, the HF is brought into contact with the particles of aluminum sulfate in admixture with nitrogen. The nitrogen is an inert gas and is employed to carry the HF into contact with the particles, to maintain a positive flow of gas through the reactor while the HF is being absorbed by the particles, and to carry any volatile reaction products out of the reactor. The amount of nitrogen employed is not critical. However, excessively large amounts of nitrogen have the disadvantage of unnecessarily prolonging the time required to produce the catalyst due to the resulting low rate of flow of the HF and to the capacity of the equipment. Generally speaking, the nitrogen should be in a proportion of from about 20 grams to about 100 grams per hour for each 400 cc. of the particles. I have found that roughly about 28 grams of nitrogen per hour per 400 cc. of particles are quite satisfactory and convenient.

The rate of flow of the hydrogen fluoride into the bed of particles should be at a rate such that the HF initially is substantially completely removed from the gaseous mixture by the bed of particles, and such flow continued until fumes of HF appear copiously in the gases passing out of the bed. While the HF may be passed into and through the bed of particles at a more rapid rate, such procedure is less desirable because it is then difficult to determine by direct observation when the preparation of the catalyst has been completed, and it is necessary to collect and recover the excess HF. Preferably, the HF is passed into the bed of particles at the rate of from about 50 grams to about 100 grams per hour for each 400 cc. of the particles, in which case, the preparation of the catalyst is complete in from about 1 to about 2 hours. If the HF is passed into the bed of particles at a lower rate, the time required for preparing the catalyst will be unduly extended and, if the rate of flow of the HF is sufficiently small, it becomes difficult to determine by direct observation when the preparation of the catalyst has been completed.

In the use of such catalyst in the preparation of vinyl fluoride by the reaction of HF with acetylene, the bed of catalyst is heated to a temperature of from about 250° C. to about 400° C., and such temperature is maintained while a gaseous mixture of HF and acetylene is passed through it. The gaseous mixture of HF and acetylene should contain the HF in a proportion of from about 2 to about 5 mols of HF to each mol of acetylene and, preferably, from about 2 to about 3 mols. Larger proportions of HF have no advantage and involve the problems of recovering and recycling of excessive amounts of HF. Temperatures, materially below 250° C., result in uneconomically low conversions. Also, temperatures, above 450° C., result in reduced conversions and in carbonization. Optimum conversions and yields are obtained at temperatures of from about 300° C. to about 400° C., and such temperatures are preferred.

The mixture of HF and acetylene should be passed through the catalyst bed at a rate of from about 20 to about 205 volumes of acetylene per volume of particles per hour. Lower rates unduly reduce the capacity of the reactor and are uneconomical. Higher rates result in excessive amounts of unreacted acetylene in the effluent gases and render the process uneconomical due to the cost of separating and recovering such acetylene. Preferably, the rate of flow of the mixture through the catalyst is from about 25 to about 205 volumes of acetylene per volume of catalyst per hour. Other conditions being equal, the lower velocities favor the formation of 1,1-difluoroethane as the main product and the higher velocities favor the formation of vinyl fluoride as the main product.

Preferably, the reaction is carried out at atmospheric pressure. Elevated pressures may be used so long as the pressure is insufficiently high to liquefy either the reactants or the products. The practical upper limit is about 15 atmospheres.

The acetylene should be purified before employing it in the process. Preferably, it is purified by passing it through water and sodium bisulfite solution to remove any acetone or aldehyde impurities, through sodium hydroxide to remove any acidic impurities or sulfur dioxide from the bisulfite scrubber, through a solution of sodium hydrosulfite containing a catalytic amount of β-anthraquinone sodium sulfonate to remove oxygen, and then through a drying column of calcium chloride; and the acetylene, employed in the examples appearing hereinafter, was so purified.

The products of the reaction may be recovered in any conventional manner, such as by condensing the products and then fractionally distilling them to separate the components thereof. Any unreacted acetylene and HF may be returned to the reactor. Preferably, when operating on a small scale, the gases are passed through an alkali solution to remove excess HF, then dried over calcium chloride, and the gas then condensed and fractionally distilled in a Podbielniak still.

Any 1,1-difluoroethane, obtained by the reaction, may be passed through the catalyst of my invention at temperatures of from 250° C. to about 400° C., preferably, from about 300° C. to about 400° C., and at a rate of from about 20 to about 80 volumes per volume of catalyst per hour and, preferably, at the rate of from about 25 volumes to about 35 volumes. Under such conditions, the 1,1-difluoroethane is dehydrofluorinated to produce high yields of vinyl fluoride. Thus, either vinyl fluoride or 1,1-difluoroethane may be recycled to increase the yield of the other.

In order to more clearly illustrate my invention, preferred modes of carrying the same into effect, and the advantageous results obtained thereby, examples are given hereinafter. In such examples, the reactor was a black iron pipe 1 inch in diameter and 33 inches long placed in a vertical position in an electric furnace 30 inches long. The bed of particles was supported on a stainless steel screen and covered by stainless steel wool. Such bed was about 30 inches long and positioned in the heated portion of the reactor. Except where otherwise expressly indicated, the bed was heated to a temperature in the range of 100° C. to 150° C. and a gaseous mixture of HF and nitrogen was flowed upward through it while maintaining the temperature in such range. The flow of the gaseous mixture into the bed was at the rate of from about 50 grams to about 100 grams per hour of HF, and roughly about 28 grams per hour of nitrogen. Such flow of the mixture of HF and nitrogen was continued until the preparation of the catalyst was complete, as shown by the appearance of copious amounts of HF fumes in the gas leaving the reactor, whereupon the flow of such gaseous mixture into the reactor was discontinued. The acetylene was first purified by the preferred method hereinbefore described. The treatment of the aluminum compounds with the mixture of nitrogen and HF and the processes employing the catalyst were all carried out at atmospheric pressure. The product mixtures, containing vinyl fluoride, were all purified by washing with aqueous alkali and drying before analysis by fractionation.

Example 1

Water was added slowly to 454 g. of aluminum sulfate at 100° C. until a homogeneous solution was obtained. The solution was then slowly evaporated to dryness and heated to 650° C. in a furnace and held at 650° C. for 4 hours. The light porous product was broken up and screened and the 6–12 mesh material used. 400 cc. of the 6–12 mesh product was put into the reactor and a mixture of HF and nitrogen was passed through the tube at 100° C. until an appreciable amount of HF appeared in the effluent nitrogen. The catalyst was then heated to 340° C. and a mixture of acetylene and HF, in a molar ratio of 1:2, was passed through the reactor at a rate of 24 volumes of acetylene per volume of catalyst per hour. (That is 9,600 cc. of acetylene and 19,200 cc. of HF per hour.) The exit gas was bubbled through 5% aqueous sodium hydroxide to absorb HF, then through a calcium chloride drying tower, and then condensed in a vessel cooled with solid carbon dioxide. Samples, taken after runs of various lengths, were fractionally distilled and showed the following analysis:

| Hours Run | 1,1-Difluoro-ethane | Vinyl Fluoride | Acetylene |
|---|---|---|---|
| | Percent | Percent | Percent |
| 5 | 94.0 | 5.8 | 0.5 |
| 17 | 81.1 | 18.4 | 0.5 |
| 30 | 63.2 | 26.1 | 0.7 |
| 35 | 66.7 | 30.9 | 2.4 |
| 50 | 70.4 | 25.7 | 3.9 |
| 65 | 57.1 | 29.3 | 13.6 |

*Example 2*

125 grams of Al$_2$(SO$_4$)$_3$.18H$_2$O was dissolved in 100 cc. of water at 90° C. and the solution was poured over 400 cc. of 4–12 mesh activated charcoal while mixing to ensure homogeneous impregnation. The mass was then dried for 4 hours at 250° C. 400 cc. of this mass was put into the reactor and a mixture of HF and nitrogen was passed through at 100° C. until copious HF fumes showed in the effluent gas. The catalyst was then heated to 320° C. and a mixture of acetylene and HF in a molar ratio of 1:3 was passed through the tube at a rate of 28 volumes of acetylene per volume of catalyst per hour (approximately 11,200 cc. of acetylene and 33,600 cc. of HF per hour). The product was collected as before and analyzed as follows:

82.4% 1,1-difluoroethane
12.7% vinyl fluoride
4.9% acetylene

*Example 3*

The process of Example 2 was repeated at different temperatures and flow rates with the following results:

| Temperature, ° C. | Volume of C$_2$H$_2$ per volume of catalyst per hour | Vinyl Fluoride | 1,1-Di-fluoro-ethane | Acetylene |
|---|---|---|---|---|
| | | Percent | Percent | Percent |
| 200 | 24 | 3.0 | 0.4 | 96.6 |
| 250 | 24 | 51.3 | 45.6 | 3.1 |
| 400 | 205 | 76.0 | ¹ 5.0 | 19.0 |

¹ Approximately.

*Example 4*

The reactor was charged with a commercial catalyst of 15% aluminum chloride supported on aluminum oxide. A mixture of HF and nitrogen was passed through the catalyst, heated at 150° C., until HF fumes appeared copiously in the effluent gas. The catalyst was then heated to 200° C. and a mixture of acetylene and HF, in a molar ratio of 1:5, was passed through the reactor at a rate of ⅓ mol of acetylene per hour for 8 hours. Fractional distillation of the product, obtained during the last 5 hours of the run, showed its composition to be 34.4% of 1,1-difluoroethane and 65.6% of acetylene. Considerable difficulty was encountered with plug-ups due to subliming aluminum chloride. Therefore, no attempt was made to repeat this experiment at higher temperatures.

*Example 5*

Aluminum phosphate was prepared by mixing solutions of aluminum sulfate and sodium phosphate and filtering and washing the precipitate. The aluminum phosphate was dried at 400° C., pulverized, screened to separate the 6–12 mesh particles, and 400 cc. of such particles were placed in the reactor. A mixture of HF and nitrogen was passed through the particles, heated at 120° C., until HF fumes appeared copiously in the effluent nitrogen. The catalyst was then heated to 300° C. and a mixture of acetylene and HF, in a molar ratio of 1:3, was passed through the reactor at a rate of 25 volumes of acetylene per volume of catalyst per hour. Fractional distillation of the product, made during an 8 hour run, had the following composition:

0% vinyl fluoride
20% 1,1-difluoroethane
80% acetylene

Examples 4 and 5 are included solely for purposes of comparison, and show that aluminum salts, outside the scope of my invention, do not produce the same results as aluminum sulfate and are not equivalents thereof.

It will be understood that the preceding examples have been given for illustrative purposes solely and that my invention is not to be limited to the specific embodiments shown therein, but that many varations and modifications can be made therein, within the scope of the general disclosure and without departing from the spirit or scope of my invention. The size of the reactor may be widely varied and other types of reactors may be employed in place thereof. The proportions, temperatures, pressures, rates of flow, proportions of reactants and the like may be widely varied as indicated in the general description.

From the preceding description and examples, it will be apparent that I have provided a new catalyst which has novel and unexpected properties, a novel method for producing the same, and a novel and advantageous method for preparing vinyl fluoride. The catalyst is easy and relatively cheap to manufacture and has a long catalyst life. Its use unexpectedly makes it possible to vary the relative yields of vinyl fluoride and 1,1-difluoroethane, as desired, by appropriate control of the conditions of operation. Therefore, it is apparent that my invention constitutes a valuable contribution to and advance in the art.

I claim:

1. A catalyst which consists essentially of the reaction product of HF with particles of aluminum sulfate obtained by flowing a gaseous mixture of HF and nitrogen through a bed of the particles of aluminum sulfate at a temperature of from about 100° C. to about 200° C. until there is a material decrease in the rate at which the HF is removed from the gaseous mixture by said bed and then discontinuing the flow of the gaseous mixture through the bed.

2. A catalyst which consists essentially of the reaction product of HF with particles of aluminum sulfate obtained by passing a gaseous mixture of HF and nitrogen through a bed of the particles of aluminum sulfate at a temperature of from about 100° C. to about 200° C. at a rate of up to about 100 grams of HF per hour per 400 cc. of the particles until fumes of HF appear copiously in the gasses passing out of the bed of particles and then discontinuing the flow of the gaseous mixture through the bed.

3. A catalyst which consists essentially of the reaction product of HF with particles of aluminum sulfate obtained by passing a gaseous mixture of HF and nitrogen through a bed of the particles of aluminum sulfate at a temperature of from about 100° C. to about 200° C. at a rate of from about 50 grams to about 100 grams of HF per hour per 400 cc. of the particles until fumes of HF appear copiously in the gasses passing out of the bed of particles and then discontinuing the flow of the gaseous mixture through the bed.

4. The process which comprises heating a bed of particles of aluminum sulfate to a temperature of from about 100° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 100° C. to about 200° C. until fumes of HF appear copiously in the gases passing out of the bed, and then discontinuing the flow of the gaseous mixture through the bed.

5. The process which comprises heating a bed of particles of aluminum sulfate to a temperature of from about 100° C. to about 200° C., flowing a gaseous mixture of HF and nitrogen through such bed of particles at a rate of from about 50 grams to about 100 grams of HF per hour per 400 cc. of the particles and such that the HF initially is substantially completely removed from the gaseous mixture by the bed of particles, continuing the flow of the gaseous mixture through the bed while maintaining the bed at a temperature of from about 100° C. to about 200° C. until fumes of HF appear copiously in the gases passing out of the bed, and then discontinuing the flow of the gaseous mixture through the bed.

6. The process which comprises heating a bed of particles of aluminum sulfate to a temperature of from about 100° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 100° C. to about 200° C. until fumes of HF appear copiously in the gases passing out of the bed, then discontinuing the flow of the gaseous mixture through the bed, then heating the bed of particles to a temperature of from about 250° C. to about 400° C. and flowing a gaseous mixture of HF and acetylene in a proportion of from about 2 to about 5 mols of HF to each mol of acetylene through such bed at a rate of from about 20 to about 205 volumes of acetylene per volume of particles per hour while maintaining the bed at a temperature of from about 250° C. to about 400° C., and separating vinyl fluoride and 1,1-difluoroethane from the gaseous mixture leaving the bed.

7. The process which comprises heating a bed of particles of aluminum sulfate to a temperature of from about 100° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 100° C. to about 200° C. until fumes of HF appear copiously in the gases passing out of the bed, then discontinuing the flow of the gaseous mixture through the bed, then heating the bed of particles to a temperature of from about 300° C. to about 400° C. and flowing a gaseous mixture of HF and acetylene in a proportion of from about 2 to about 5 mols of HF to each mol of acetylene through such bed at a rate of from about 25 to about 205 volumes of acetylene per volume of particles per hour while maintaining the bed at a temperature of from about 300° C. to about 400° C., and separating vinyl fluoride and 1,1-difluoroethane from the gaseous mixture leaving the bed.

References Cited in the file of this patent

UNITED STATES PATENTS

| | | |
|---|---|---|
| 2,194,186 | Pier et al. | Mar. 19, 1940 |
| 2,246,900 | Schulze et al. | June 24, 1941 |
| 2,353,552 | Drennan | July 11, 1944 |
| 2,574,480 | Hillyer et al. | Nov. 13, 1951 |